United States Patent

Eum et al.

[11] Patent Number: 5,855,436
[45] Date of Patent: Jan. 5, 1999

[54] FLUID BEARING APPARATUS

[75] Inventors: Jae-yong Eum, Kyonggi-do; Chang-woo Lee, Kyongg-do, both of Rep. of Korea

[73] Assignee: Samsung Electronics Co., Ltd., Kyungki-Do, Rep. of Korea

[21] Appl. No.: 961,274

[22] Filed: Oct. 30, 1997

[30] Foreign Application Priority Data

Oct. 30, 1996 [KR] Rep. of Korea .................. 1996 50378

[51] Int. Cl.[6] .................................................. F16C 17/10
[52] U.S. Cl. ............................................................ 384/110
[58] Field of Search ................................... 384/110, 246, 384/113, 115, 107

[56] References Cited

U.S. PATENT DOCUMENTS 2,966,381  12/1960  Menzel ..................................... 384/110
4,043,612   8/1977  Orcutt ...................................... 384/110
4,919,547   4/1990  Schwartzman ........................... 384/110

*Primary Examiner*—Lenard A. Footland
*Attorney, Agent, or Firm*—Sughrue, Mion, Zinn, Macpeak & Seas, PLLC

[57] ABSTRACT

A fluid bearing apparatus having an increased contact area between a body and a bushing and having a compact size. In the fluid bearing apparatus according to the present invention, a body extends from a shaft fixed to a lower bearing bracket in a lengthwise direction, which has a conical groove at one end and a truncated cone at the other end. An upper bushing includes a recess for receiving the one end of the body and having a conical protrusion formed therein. The conical protrusion is inserted into the conical groove of the body. A lower bushing has a recess receiving the other end of the body and a through hole extending through the lower bushing. The shaft is slidably inserted into the through hole. The upper bushing is separately combined with the lower bushing. Accordingly, the bushing which receives the body, may be decreased in volume, so that a motor to which the fluid bearing apparatus is applied, can be reduced in a total size.

7 Claims, 2 Drawing Sheets

FLUID BEARING APPARATUS

BACKGROUND OF THE INVENTION

1. Field of the Invention

The present invention relates to a fluid bearing apparatus and more particularly to a fluid bearing apparatus having an increased contacting area of a bearing and rotating elements and a compact size.

2. Description of the Related Art

Recently, with improvements in the fields of information and computer technology, there has arisen a need for rotary shafts with higher rotational speed and accuracy, but without unwanted movement or oscillation. Such rotary shafts are needed in driving motors for various machines, such as a polygon mirror driving gear of a laser printer, a spindle motor of a hard disk, a head driving motor of a video cassette recorder, and the like. A driving motor capable of stable rotating at high speed while preventing the movement or oscillation of the rotary shaft has been developed together with a fluid bearing apparatus which enables the rotary shaft of the driving motor to rotate at high speed with high accuracy.

The fluid bearing apparatus, as described above, generally has dynamic pressure generating flutes formed therein. There are two types of the dynamic pressure generating flutes. One type of the dynamic pressure generating flutes is a spiral shape and the other type is a herringbone shape. The spiral shaped dynamic pressure generating flutes are mainly applied to thrust bearings supporting thrust load and the herringbone shaped dynamic pressure generating flutes are mainly applied to radial bearings supporting a radial load.

In the case of a conical fluid bearing apparatus, one of the conventional fluid bearing apparatus, various structures have been proposed to provide sufficient rising forces in a short time for rotating elements, such as a bushing, a plate, and the like.

FIG. 1 is a cross-sectional view of a conventional driving apparatus of a polygon mirror, in which a conical bearing apparatus is applied to the driving apparatus to increase a contact area of a bushing and a shaft.

The conical bearing 70 includes a body 45 and an upper cone 45a and a lower cone 45b which are respectively formed at both ends of the body 45, while extending from one end of a fixing shaft 40. The body 45 connects the upper cone 45a to the lower cone 45b and has a predetermined diameter. Furthermore, the upper and lower cones 45a and 45b have tapered sectional shapes and extend outwardly from the body 45. The dynamic pressure generating flutes 45a', 45b' are respectively formed on the tapered surface of the upper and lower cones 45a and 45b. When the rotating elements rotate, the dynamic pressure is generated in the bearing resulting in shifting up the upper and lower bushing 30 and 32. In FIG. 1, reference numerals 10, 50, and 60 respectively indicate a polygon mirror, a plate having a rotor mounted thereon, and a lower bearing bracket.

In the bearing apparatus as constructed above, however, the upper cone 45a which is formed at one end of the body 45 is made to extend in the lengthwise direction of the fixing shaft 40 so that the cross-section area is gradually reduced from the one end of the body 45 to the top of the cone 45a. Thus, the height of the upper bushing 30 is increased as much as the length of the upper cone 45a. Therefore, there is a problem in that a total size of the motor is increased.

SUMMARY OF THE INVENTION

The present invention has been made to overcome the above described problem of the prior art. It is an object of the present invention to provide a fluid bearing apparatus for providing a rising force for a rotating body and for causing a motor to which the fluid bearing apparatus is applied, to be reduced in a size.

To accomplish the above object of the present invention, there is provided a bearing apparatus comprising:

a shaft which is fixed to a lower bearing bracket;

a bearing for including a body extending from the shaft in lengthwise direction, the bearing having a conical groove formed at one end thereof and a truncated cone at an other end thereof;

an upper bushing for including an upper recess which receives the one end of the bearing and has a conical protrusion inside of the upper recess, the conical protrusion being inserted into the conical groove; and a lower bushing for including a lower recess which receives the other end of the bearing and has a through hole extending through the lower bushing, the shaft being slidably inserted into the through hole and the upper bushing being separately combined with the lower bushing.

In the fluid bearing apparatus according to the present invention, a herringbone shaped dynamic pressure generating flutes are formed on a peripheral surface of the body so as to correspond to radial loads.

Dynamic pressure generating flutes are formed on an inner surface of the conical groove and an outer surface of the truncated cone.

Dynamic pressure flutes are formed on an outer surface of the conical protrusion and an outer surface of the truncated cone.

The dynamic pressure generating flutes have a spiral shape.

The bearing includes a conical bearing or a semi-spheric bearing.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a preferred embodiment of the present invention will be described in detail with reference to the accompanying drawings.

Figure 1:
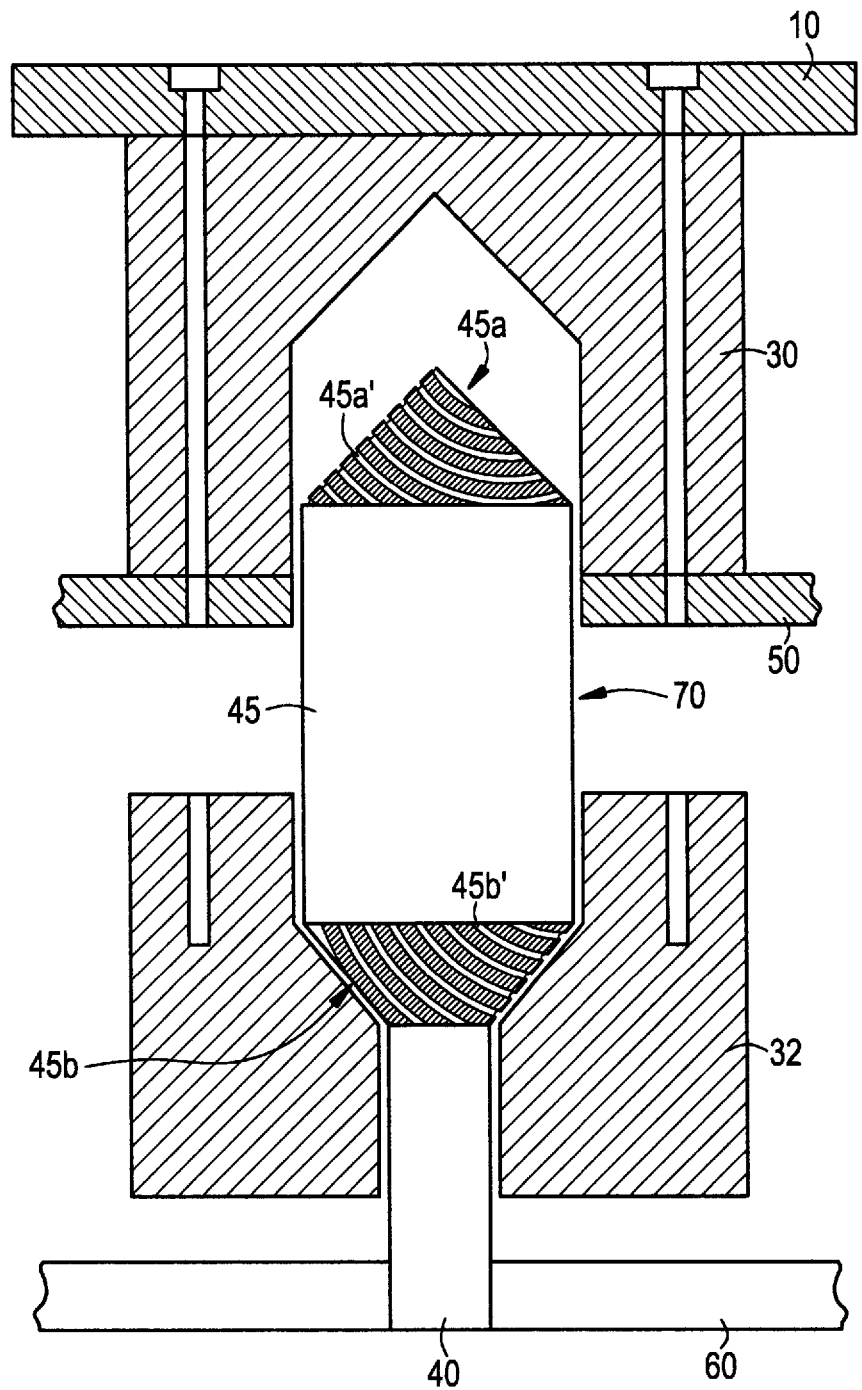
FIG. 1 is a sectional view of a driving apparatus of a polygon mirror to which a fluid bearing apparatus according to the conventional art is applied.
Figure 2:
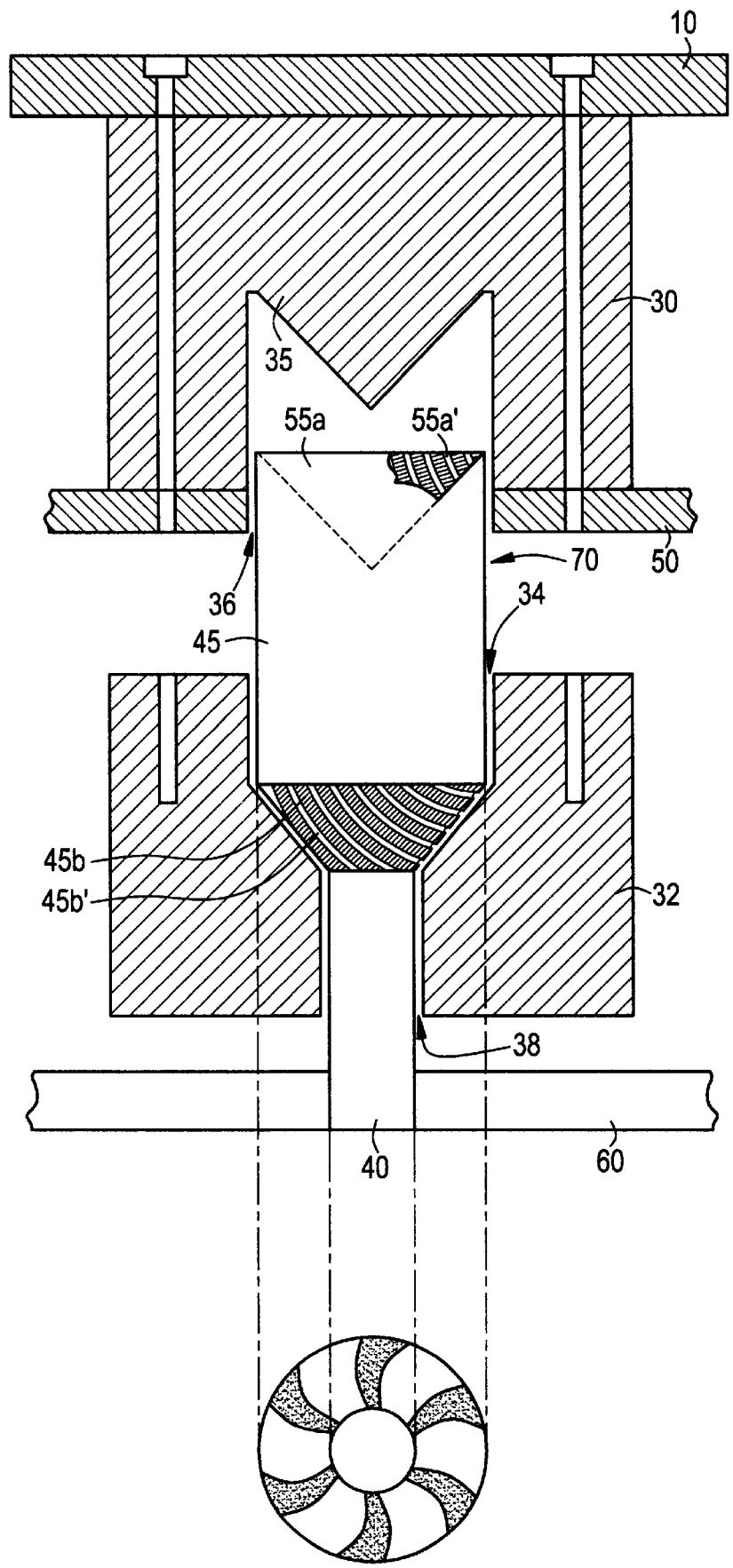
FIG. 2 is a sectional view of a driving apparatus of a polygon mirror to which a fluid bearing apparatus according to the present invention is applied.

FIG. 2 is a sectional view of a driving apparatus of a polygon mirror to which a fluid bearing apparatus according to the conventional art is applied. While the present invention will be described with reference to a conical bearing as an example, it will be understood that the conical bearing may be changed into a semi-spheric bearing. Also, the same reference numerals will be used to indicate the same elements of FIG. 1.

As shown in FIG. 2, a conical bearing 70 extends in a lengthwise direction from an end of shaft 40 which is fixed to a lower bearing bracket 60. The conical bearing 70 includes a body 45, a conical groove 55a and a truncated cone 45b respectively formed at both ends of the body 45. The body 45 has a column shape with a predetermined diameter.

The conical groove 55a is formed at one end of the body 45. The truncated cone 45b is formed at the other end of the body 45 and connected to the shaft 40. Also, the conical groove 55a and the truncated cone 45b are directed in the same direction and gradually reduced in a cross-sectional area. On the other hand, dynamic pressure generating flutes 55a' and 45b' are respectively formed on an inner surface of the conical groove 55a and an outer surface of the truncated groove 45, so that the bearing of the present invention generates a larger rising force than a conical bearing having only a tapered surface so as to push up the bushings 30 and 32. Preferably, the dynamic pressure generating flutes are formed in a spiral shape on the inner surface of the conical groove 55a and the outer surface of the truncated cone 45b.

A polygon mirror 10 is integrally combined with an upper bushing 30, a lower bushing 32, and a plate 50. An upper recess 36 is formed in the upper bushing 30 as to receive the one end of the body 45 of the bearing 70 and has a conical protrusion 35, which is inserted into the conical groove 55a, formed on a bottom of the upper recess 36. Also, a lower recess 34 is formed in the lower bushing 32 as to receive the other end of the bearing 70 and the truncated cone 45b. Furthermore, a through hole 38 extends through the lower bushing 32. The shaft 40 is slidably inserted into the through hole 38.

The assembling of the fluid bearing apparatus as constructed above will be described in detail. The shaft 40 integrally combined with the bearing 70 is first inserted into the through hole 38 of the lower bushing 32 and fixed to the bracket 60. Second, the polygon mirror 10, the upper bushing 30, the plate 50, and the lower bushing 32 are connected to each other by a fixing member such as a screw. At this time, the conical protrusion 35 which is downwardly projected in the upper recess 36 of the upper bushing 30, is inserted into the conical groove 55a of the bearing 70.

Hereinafter, the operation of the bearing 70 according to the present invention will be described.

When electricity is applied to a stator (not shown) and a rotor (not shown) mounted on the plate 50 as to be opposite to the stator, the electromagnetic action rotates the plate 50. Thereby, the upper and lower bushings 30 and 32 and the polygon mirror 10 start to rotate. The conical protrusion 35 and the conical groove 55a are in close contact with each other due to the weight of the rotating elements, for example bushings 30 and 32, and the truncated cone 45b and the lower recess 34 are spaced apart from each other. In the state as described above, when the bushings 30 and 32 rotate, fluid is introduced into the dynamic pressure generating flutes 55a' formed on the inner surface of the conical groove 55a so as to generate dynamic pressure, thereby rising the upper bushing 30 in a short time. Thus, a clearance becomes narrow which is between the truncated cone 45b and the lower recess 34. Then, when fluid is introduced into the dynamic pressure flutes 45b' formed on the outer surface of the truncated cone 45 so as to generate dynamic pressure, the clearance is subjected to change until the dynamic pressure at the upper recess 36 and the dynamic pressure at the lower recess 34 are in equilibrium.

A stable rotation of the rotating elements is established by the operation as described above in a short time. Since the conical groove is formed in the body of the bearing and the conical protrusion is formed in the upper recess of the bushing as to be inserted into the conical groove, it can be possible to reduce a volume of the bushing which receives the body of the bearing. Furthermore, there is an advantage in that a volume of a motor having the bearing can be reduced. Also, in the early starting state of the motor in which the rotating elements including the bushing and the like rotates at a deficient velocity, the bearing gains a satisfactory dynamic pressure enough to overcome the weight of the rotating elements so that it can be possible to reduce an abrasion of the bearing and the rotating elements.

Even if the dynamic pressure generating flutes are formed on the outer surface of the conical protrusion, it may be possible not to form dynamic pressure generating flutes in the conical groove of the bearing. In the case of forming the herringbone shape of the dynamic pressure generating flutes on the peripheral surface of the body of the bearing, the dynamic pressure generating flutes can correspond to a radial load around the shaft so as to prevent the shaft from contacting with the bushing.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A fluid bearing apparatus comprising:

a shaft which is fixed to a lower bearing bracket;

a bearing including a body extending from said shaft in a lengthwise direction, said bearing having a conical recess formed at one end thereof and a truncated cone at an other end thereof;

an upper bushing for including an upper recess which receives said one end of said bearing and has a conical protrusion inside of said upper recess, said conical protrusion being inserted into said conical recess; and a lower bushing for including a lower recess which receives said other end of said bearing and has a through hole extending through said lower bushing, said shaft being slidably inserted into said through hole and said upper bushing being separately combined with said lower bushing.

2. A fluid bearing apparatus as claimed in claim 1, wherein herringbone shaped type of dynamic pressure generating flutes are formed on a peripheral surface of said body for corresponding to radial loads.

3. A fluid bearing apparatus as claimed in claim 1, wherein dynamic pressure generating flutes are formed on an inner surface of said conical recess and an outer surface of said truncated cone.

4. A fluid bearing apparatus as claimed in claim 1, wherein dynamic pressure flutes are formed on an outer surface of said conical protrusion and an outer surface of said truncated cone.

5. A fluid bearing apparatus as claimed in claim 3 or 4, wherein said dynamic pressure generating flutes have a spiral shape.

6. A fluid bearing apparatus as claimed in claim 1, wherein said bearing includes a conical bearing.

7. A fluid bearing apparatus as claimed in claim 1, wherein said bearing is a semi-spheric bearing.

* * * * *